United States Patent [19]

Barbic

[11] 4,424,407
[45] Jan. 3, 1984

[54] ELECTRICAL OUTLET SAFETY COVER

[76] Inventor: Mark J. Barbic, 4955 Mayfield Ct., San Jose, Calif. 95130

[21] Appl. No.: 325,736

[22] Filed: Nov. 30, 1981

[51] Int. Cl.³ .............................................. H02G 3/18
[52] U.S. Cl. ..................................... 174/67; 339/75 P
[58] Field of Search ................... 174/66, 67; 220/241, 220/242; 339/36, 75 P, 103 R

[56] References Cited

U.S. PATENT DOCUMENTS

| | | | |
|---|---|---|---|
| 2,415,602 | 2/1947 | Monaco | 174/67 X |
| 2,916,733 | 12/1959 | Hirsch | 174/67 X |
| 3,204,807 | 9/1965 | Ramsing | 174/67 X |
| 4,045,108 | 8/1977 | Olsen | 339/75 P |
| 4,105,274 | 8/1978 | Casey | 339/75 P |
| 4,109,095 | 8/1978 | Kling et al. | 174/67 |

FOREIGN PATENT DOCUMENTS 843929  8/1960  United Kingdom ........... 174/138 D

*Primary Examiner*—A. T. Grimley
*Assistant Examiner*—D. A. Tone
*Attorney, Agent, or Firm*—Willis E. Higgins

[57] ABSTRACT

An electrical outlet safety cover (10 or 50) comprises a top (20 or 52) dimensioned and configured to fit over an electrical outlet (16) and define a closed space (18 or 58) of sufficient size to include a plug (36) inserted in the outlet (16). The top (20 or 52) defines an opening (32 or 56) through which an electrical cord (34) attached to the plug (36) may pass. Means (24 or 60) removably fastens the top (20 or 52) to a faceplate (14) of the electrical outlet (16). The covers (10 or 50) are substantially fluid tight when installed on the electrical outlet (16).

4 Claims, 2 Drawing Figures

ELECTRICAL OUTLET SAFETY COVER

BACKGROUND OF THE INVENTION

1. Field of the Invention

This invention relates to a novel electrical outlet safety cover which prevents accidental electrical shocks while the electrical outlet is in use. More particularly, it relates to such a safety cover which is especially adapted for use in preventing electrical shocks to small children, but which allows access to the electrical outlet for plugging and unplugging electrical appliances to the outlet. It further relates to such an outlet safety cover which can be used where water may splash on it.

2. Description of the Prior Art

U.S. Pat. No. 2,415,602 discloses a safety cover which fits over an outlet to prevent access to either the sockets or plugs when plugged into the sockets. However, that device as disclosed is not waterproof. It further crimps an electrical cord connected to the plug against the plug in an effort to prevent the plug from being pulled out by pulling on the cord.

Further, with the advent of hot tubs, spas and similar water containing eletrically powered equipment in the home, there is a need for a watertight safety cover for electrical outlets used around such equipment.

Thus, while the prior art provides a partial solution to the hazard of electrical outlets for small children, and around water there is a need for further improvement in them.

SUMMARY OF THE INVENTION

Accordingly, it is an object of this invention to provide an electrical outlet safety device which will prevent access to the outlet by a child when the outlet is in use.

It is still another object of the invention to provide an electrical outlet safety cover which will protect against a plug being pulled from a socket to the outlet without crimping a cord attached to the plug against the plug.

It is still another object of the invention to provide such a safety device which may be used in environments where water may splash around the outlet.

It is yet another object of the invention to provide such a safety device which will aid in blocking air flow through electrical outlets into the rooms of a building.

The attainment of the foregoing and related objects may be achieved through use of the novel electrical outlet safety cover herein disclosed. The cover comprises an enclosure dimensioned and configured to fit over the electrical outlet and define a closed space of sufficient size to include a plug inserted in the outlet. The enclosure defines an opening through which an electrical cord attached to the plug may pass. A means is provided for removably fastening the enclosure to a fireplace of the electrical outlet. In a preferred form, the fastening means is a screw threaded to mate with the screw threads utilized to fasten the faceplate to the electrical outlet in a conventional electrical outlet assembly. The cover is substantially fluid tight when it is in use against the faceplate of an electrical outlet. The cover also preferably includes a means for grasping the electrical cord disposed inside the cover.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
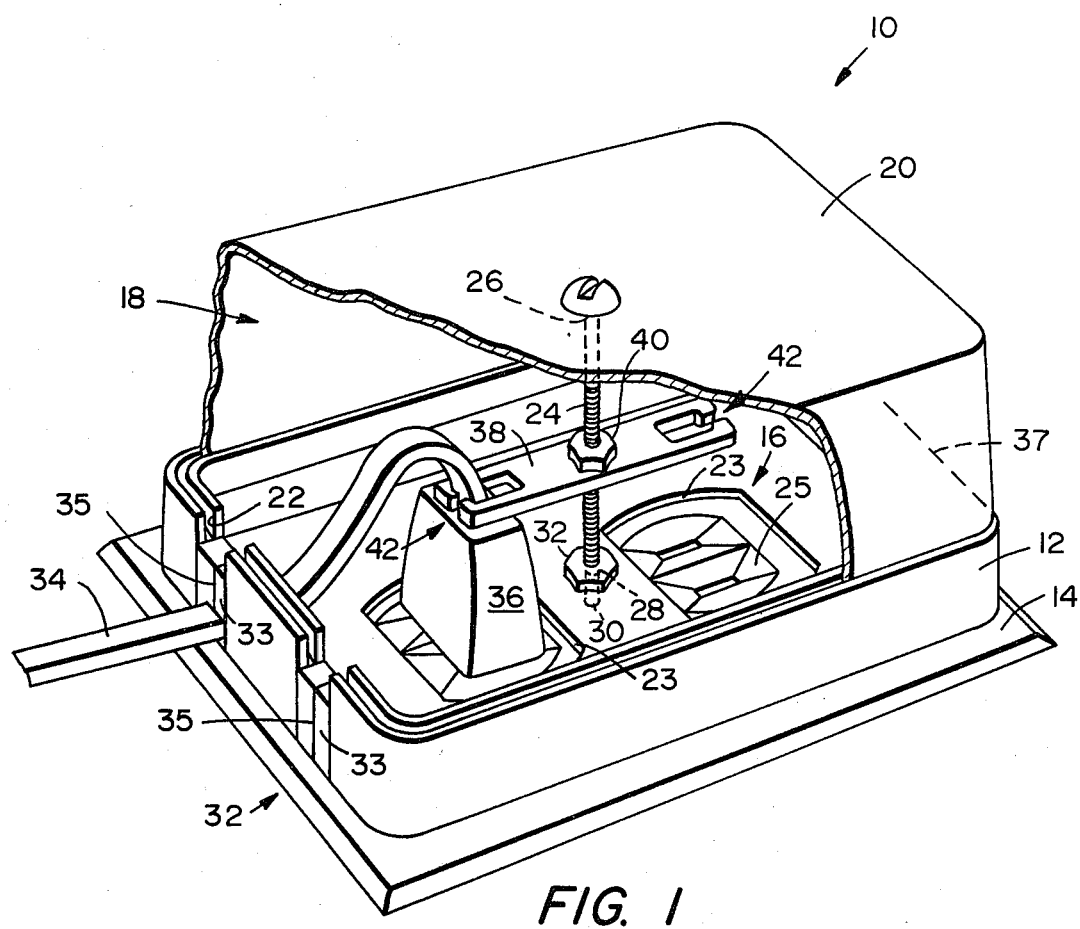
FIG. 1 is a perspective view with a partial cutaway to show interior detail, of an electrical outlet safety cover in accordance with the invention.

Turning now to the drawings, more particularly to FIG. 1, there is shown an electrical outlet safety cover 10 in accordance with the invention. The cover 10 has a base 12, which rests on faceplate 14 of the electrical outlet 16. The enclosure 18 formed by the cover 10 is completed by a top 20, which fits into base 12. Base 12 has a lip portion 22 into which the top 20 fits to form a moisture-resistant seal around the periphery of the cover 10. Base 12 also has a pair of apertures 23 which expose sockets 25 of the outlet 16. Screw 24 passes through apertures 26 and 28 in cover 20 and base 12, respectively, to fasten the cover and base to faceplate 14. Screw 24 interacts with mating threads 30 in the electrical outlet 16, which are used to fasten the faceplate 14 to the electrical outlet 16. Screw 24 is provided with an enlarged portion 32 along its length for the purpose of fastening the base 12 and faceplate 14 securely to the outlet 16. Apertures 32 are provided in the base 12 to allow electrical cords 34 attached to plug 36 to pass out of the enclosure 18. A rubber or similar plastic grommet 33 having an upwardly facing opening 35 for receiving the cord 34 further makes the cover resistant to entry of moisture and protects the cord 34 against abrasion or cutting. If desired, a flexible hinge 37 can be provided along the edges of top 20 and base 12 remote from the edge containing apertures 32. A strip 38 is mounted on screw 24 by nuts 40 on either side of the strip 38. Strip 38 has notches 42 at each end for grasping cord 34 to aid against pulling plug 36 from its socket.

Figure 2:
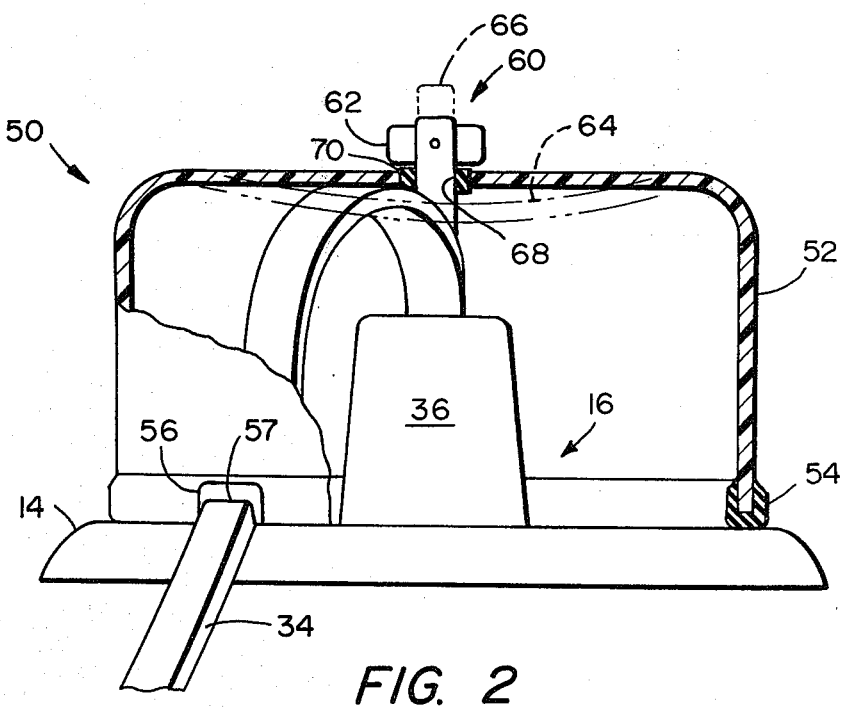
FIG. 2 is a cross-section view of another embodiment of the invention.

FIG. 2 shows another embodiment of an electrical outlet safety cover 50. In this embodiment, the top 52 fits directly on faceplate 14 of the electrical outlet 16. A layer 54 of rubber or soft plastic is provided around the periphery of the cover 52 for forming a moisture-resistant seal against the faceplate 14. Top 52 has opening 56 similar to the openings 32 in FIG. 1, to allow the cord 34 to pass out of enclosure 58, and a rubber grommet 57. Screw 60 in this embodiment has a pivotally mounted head 62 for easy removal of the top 52, when it is desired to plug in or unplug a plug 36 into or from the outlet 16. For this purpose, top 52 is desirably fabricated of a resilient plastic material, such as polyethylene, so that it may be deformed to the position shown at 64, so that the pivotal head 62 of screw 60 can be moved to the position shown at 66. Aperture 68 through the cover 52 may then pass along the head 62 to remove the cover 52. After plugging or unplugging the plug 36 into or from the outlet 16, the sequence is reversed to replace the cover 52 on the outlet 16. A rubber or similar gasket 70 in aperture 68 further aids in making the cover 50 fluid tight.

The construction of FIG. 2 is especially intended for use with outlets 16 where it is desired to plug or unplug the plug 36 repeatedly. The pivotal head 62 allows the cover 52 to be easily removed by an adult, yet difficult for a child to remove accidentally. The more conventional screw 24 shown in FIG. 1 may be used with outlets 16 with which the plug 36 remains plugged in on a more or less permanent basis, such as for use with television sets and stereos. The screw 60 can also be used with the FIG. 1 embodiment. The resilient gasket 54 in FIG. 2 can also be used with the FIG. 1 embodiment. Both embodiments are substantially fluid tight, so that water does not enter the covers 10 or 50, and cold air cannot enter a room through the outlets 16 with the covers 10 or 50 in place.

In addition to a deformable plastic, the safety covers 10 and 50 of this invention may be fabricated of other, preferably insulator, materials, such as wood or a rigid plastic. Screw 60 can also be used with a safety cover 10 shown in FIG. 1. The cover 10 or 50 is preferably fabricated of a fire resistant plastic, such as an Underwriters' Laboratories listed ABS type plastic obtained from Borg-Warner Corporation.

It should now be apparent to those skilled in the art that an electrical outlet safety cover capable of achieving the stated objects of the invention has been provided. The cover of this invention limits access to an electrical outlet whether or not the electrical outlet is in use. It therefore prevents a shock hazard to small children from insertion of foreign objects into an outlet, from partial insertion of a plug into an outlet, and from partial removal of a plug from the outlet. The cover further blocks air flow into rooms of a building through electrical outlets.

It should further be apparent to those skilled in the art that various changes in form and details of the invention as shown and described may be made. It is intended that such changes be included within the spirit and scope of the claims appended hereto.

What is claimed is:

1. An electrical outlet safety cover, which comprises an enclosure dimensioned and configured to fit over the electrical outlet and define a closed space of sufficient size to include a plug inserted in the outlet, said enclosure defining an opening through which an electrical cord attached to the plug may pass, a screw threaded to mate with screw threads for fastening the faceplate to the electrical outlet, for removably fastening said enclosure to a faceplate of the electrical outlet, said screw having a pivotally mounted head for releasably fastening the enclosure to the faceplate, said enclosure being formed from a deformable material, deformation of the enclosure toward the faceplate allowing the pivotal head of the screw to be pivoted for removal of said enclosure from the faceplate, and said enclosure when free of deformation preventing the head of said screw from being pivoted for removal of said enclosure from the faceplate.

2. The electrical outlet safety cover of claim 1 in which said enclosure has a resilient, seal-forming material around a periphery of said enclosure in contact with the faceplate when the cover is installed.

3. The electrical outlet safety cover of claim 2 in which the opening through which the electrical cord may pass extends through a wall of said enclosure and has a resilient material positioned to contact the electrical cord.

4. An electrical outlet safety cover, which comprises an enclosure dimensioned and configured to fit over the electrical outlet and define a closed space of sufficient size to include a plug inserted in the outlet, said enclosure defining an opening through which an electrical cord attached to the plug may pass, and means for removably fastening said enclosure to a faceplate of the electrical outlet, said cover having a base and a top, said base having a lip around a periphery thereof to receive a peripheral edge of said top, said base being mounted in facing relationship to the faceplate of the electrical outlet when said cover is in use.

* * * * *